United States Patent [19]

Honda et al.

[11] Patent Number: 5,592,542
[45] Date of Patent: Jan. 7, 1997

[54] CALL DISTRIBUTION CONTROL METHOD AND CALL DISTRIBUTION CONTROL SYSTEM

[75] Inventors: Yosuke Honda; Motoharu Usumi; Syuich Tanaka, all of Kawasaki, Japan

[73] Assignee: Fujitsu Limited, Kanagawa, Japan

[21] Appl. No.: 610,848

[22] Filed: Mar. 5, 1996

Related U.S. Application Data

[63] Continuation of Ser. No. 114,684, Aug. 31, 1993, abandoned.

[30] Foreign Application Priority Data

Feb. 2, 1993 [JP] Japan .................................. 5-015297

[51] Int. Cl.$^6$ .......................... H04M 3/00; H04Q 3/64
[52] U.S. Cl. ...................... 379/265; 379/266; 379/309
[58] Field of Search ..................... 379/265, 266, 379/309, 210, 211, 212, 214, 201

[56] References Cited

U.S. PATENT DOCUMENTS

4,951,310   8/1990   Honda et al. .................. 379/266
5,046,088   9/1991   Margulies ..................... 379/265
5,206,903   4/1993   Kohler et al. .................. 379/266
5,309,513   5/1994   Rose ........................... 379/266

*Primary Examiner*—Ahmad F. Matar

[57] ABSTRACT

In a call distribution control method for terminating an incoming call from a trunk or another extension at a pilot extension in a private branch exchange and routing the incoming call from the pilot extension to an idle agent in an agent group, a routing table corresponding to the pilot extension is provided for designating one or plural agent groups to which the incoming call is to be routed. Priorities are assigned to agents constituting the agent groups, and an agent group to which the incoming call is to be routed is decided, based upon the routing table when the incoming call is terminated at the pilot extension. The incoming call is routed to an idle agent, in the order of priority thereof, in the agent group to which the incoming call has been routed. Further, a prescribed agent is allocated to a plurality of agent groups upon assigning a priority to this agent.

11 Claims, 9 Drawing Sheets

| | |
|---|---|
| ANNOUNCEMENT 1 | — RST1 |
| GROUP G1 | — RST2 |
| WAIT FOR TIME X1 | — RST3 |
| GROUP G3 | — RST4 |
| WAIT FOR TIME X2 | — RST5 |
| ROUTE TO ATTENDANT | — RST6 |

| AGENT EXTENSION NO. | AGENT GROUP | PRIORITY | AGENT GROUP | PRIORITY | |
|---|---|---|---|---|---|
| $A_1$ | $G_1$ | 1 | | | |
| $A_2$ | $G_3$ | 2 | | | |
| $A_3$ | $G_2$ | 2 | $G_2$ | 3 | --- |
| ¦ | ¦ | ¦ | ¦ | ¦ | |

CALL DISTRIBUTION CONTROL METHOD AND CALL DISTRIBUTION CONTROL SYSTEM

This is a continuation of application Ser. No. 08/114,684, filed Aug. 31, 1993, (now abandoned).

BACKGROUND OF THE INVENTION

This invention relates to a call distribution control method and a call distribution control system. More particularly, the invention relates to a call distribution control method and system in which an incoming call from a trunk or another extension is terminated at a pilot extension in a private branch exchange and the call is routed from the pilot extension to an idle agent extension in an agent group.

In a system wherein there are a large number of incoming calls terminated at a private branch exchange, such as in a seat booking system for airplanes and trains, an automatic call distribution (ACD) control method is known in which efficient operation is achieved by distributing the incoming calls equally to a plurality of extensions (referred to as "agents"). In an ACD control system of this type, an agent group is composed of a plurality of agents (extensions) and the next incoming call is terminated at whichever agent in the agent group has been in the idle state longest.

The increasing popularity of ACD systems in recent years has led to demand for distribution control through which ACD calls may be distributed to agents more efficiently and in a more specialized manner. Accordingly, there is now need for call distribution control in which the number of transfers of ACD calls can be changed in conformity with the skill level of each agent.

Figure 10:
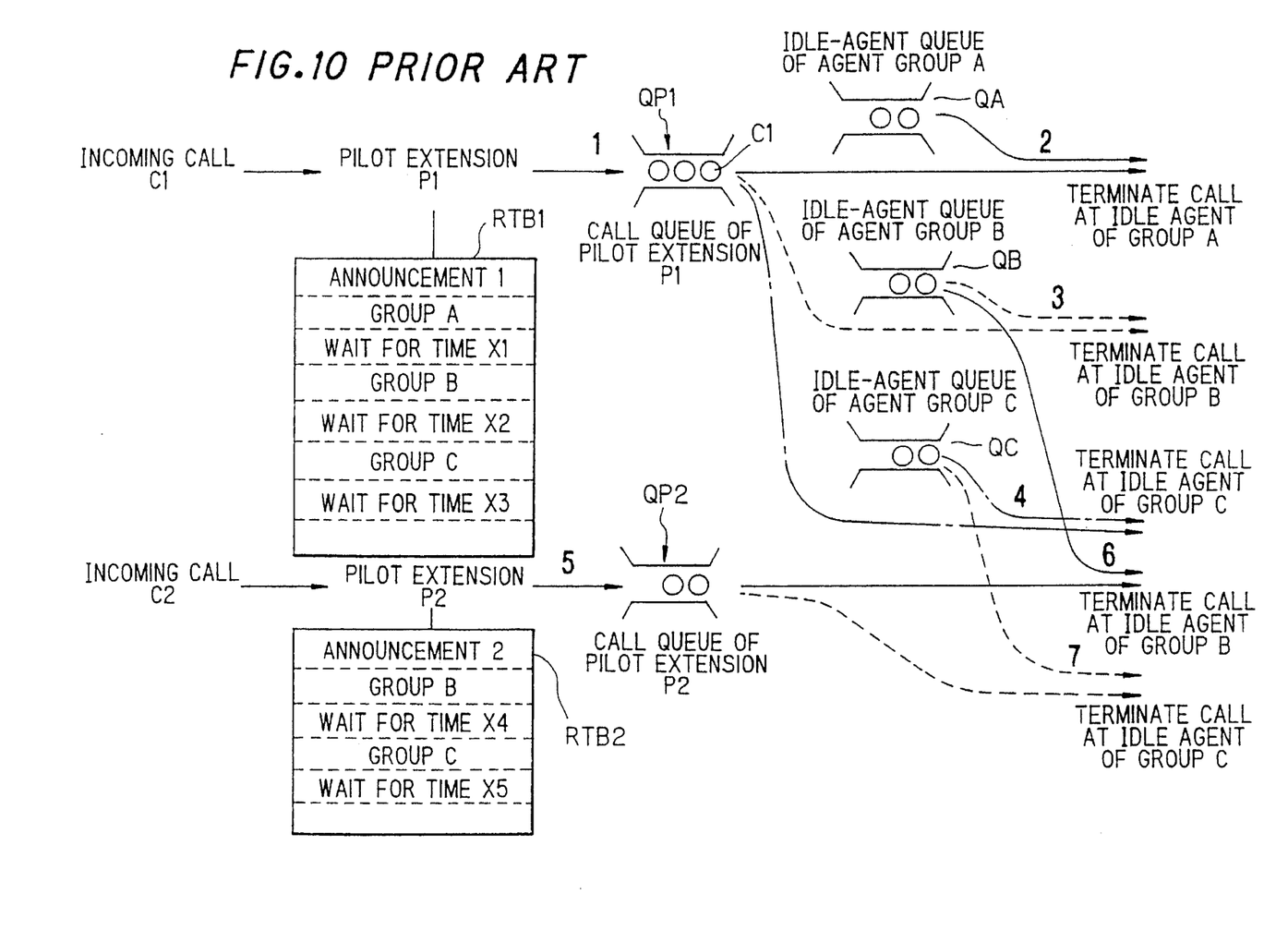
FIG. 10 is a diagram for describing a call distribution control according to the prior art.

In conventional ACD control disclosed in the specification of U.S. Pat. No. 4,951,310, as shown in FIG. 10, routing tables RTB1, RTB2 are provided for respective pilot extensions P1, P2. When incoming calls C1 and C2 terminate at the pilot extensions P1 and P2, respectively, the calls C1 and C2 are connected to call queues QP1 and QP2 corresponding to the pilot extensions PT1 and PT2. With regard to incoming calls that have been queued, the steps of the corresponding routing tables RTB1, RTB2 are executed and the calls are terminated at the prescribed agents (extensions) in the agent group designated by the routing tables.

By way of example, if call C1 is terminated at the pilot extension P1 and connected to the call queue QP1 (see ①), the first step of the routing table RTB1 is read out, a predetermined announcement is made and then a music source is connected to the incoming call so as to transmit a melody to the calling party. The second step of searching for an idle agent of the agent group A is then executed under these conditions, whereby an idle-agent queue QA in agent group A is sought. If there is an idle agent (extension) in the queue, the incoming call C1 is terminated at this idle agent (see ②), the incoming call C1 is removed from the call queue QP1, the terminating agent is removed from the idle-agent queue QA and control for distribution of incoming call C1 is ended.

If, on the other hand, an idle agent does not become available in the agent group A even after elapse of a prescribed period of time X1 (third step), the fourth step of searching for an idle agent of an agent group B in the routing table RTB1 is executed. As a result of executing the fourth step, an idle-agent queue QB in agent group B is added on as the object of the search. If an idle agent is found, the incoming call C1 is terminated at this idle agent (see ③), the incoming call C1 is removed from the call queue QP1, the terminating agent is removed from the idle-agent queue QB and control for distribution of incoming call C1 is ended.

If an idle agent does not become available in the agent groups A and B even after elapse of a prescribed period of time X2 (fifth step), the sixth step of searching for an idle agent of an agent group C in the routing table RTB1 is executed. As a result of executing the sixth step, an idle-agent queue QC in agent group C is added on as the object of the search. If an idle agent is found, the incoming call C1 is terminated at this idle agent (see ④), the incoming call C1 is removed from the call queue QP1, the terminating agent is removed from the idle-agent queue QC and control for distribution of incoming call C1 is ended.

If an idle agent does not become available in the agent groups A, B and C even after elapse of a prescribed period of time X3 (seventh step), the search for an idle agent is halted, the incoming call C1 is removed from the call queue QP1 and connected to an attendant operator and the operator makes a response. If necessary, the operator transmits a response telling the caller to try calling again later.

If the call C2 is terminated at the pilot extension P2 and connected to the call queue QP2 (see ⑤), the steps of the routing table RTB2 are read out successively and are executed in a manner similar to that described above. When the agent group B is searched and an idle agent is not found in a fixed period of time X4, as indicated at ⑥ and ⑦, a search for an idle agent is executed extending the search to agent groups beyond agent group C.

In accordance with this conventional call distribution control, a routing table is provided for each of the pilot extensions P1 and P2. This is advantageous in that the agent group that terminates the incoming call can be changed and designated freely merely by rewriting the contents of the routing table.

However, the ACD calls are distributed equally to all of the agents in the agent group, and the number of transfers of ACD calls is not changed in conformity with the skill level of each agent. More specifically, the agents include unskilled agents capable of dealing with only one type of call (service) as well as skilled agents capable of handling a number of types of calls (services). With the conventional system, however, the incoming calls are distributed among the agents equally irrespective of their skill levels. As a consequence, skilled agents are not utilized satisfactorily and more efficient, precisely devised services cannot be offered.

In addition, there is a difference in skill level even among agents capable of dealing with only one type of call (service). Since incoming calls are distributed equally even among these agents in the prior art, the agents cannot be utilized in a satisfactory manner and more efficient, precisely devised services cannot be offered efficiently.

Furthermore, in addition to specialized agents dedicated to a single task, there are also unspecialized agents who perform other tasks, and there are cases in which it is desired to have these unspecialized agents answer incoming calls on an assistant basis only when there is an increase in traffic. With conventional call distribution control, however, the incoming calls are distributed equally among the agents and therefore control of the type described cannot be achieved.

SUMMARY OF THE INVENTION

An object of the present invention is to provide a call distribution control method and a call distribution control system in which the number of transfers of ACD calls terminated at each agent can be changed.

Another object of the present invention is to provide a call distribution control method and a call distribution control system in which the number of transfers of ACD calls terminated at an agent can be controlled in dependence upon level of skill or the like by assigning priority levels to the agents.

A further object of the present invention is to provide a call distribution control method and a call distribution control system in which skilled agents can be utilized in a satisfactory manner by allocating skilled agents to a plurality of agent groups.

Yet another object of the present invention is to provide a call distribution control method and a call distribution control system of greater efficiency and capable of providing more specialized services.

According to the present invention, the foregoing objects are attained by providing a routing table in correspondence to a pilot extension for designating an agent group to which an incoming call is to be routed, assigning predetermined priority levels to agents in an agent group, deciding an agent group that is a routing destination based upon the routing table when a call is terminated at the pilot extension, and routing the call to an idle agent, in the order of priority level thereof, in the agent group that is the routing destination.

Further, according to the present invention, the foregoing objects are attained by providing a routing table in correspondence to a pilot extension for designating an agent group to which an incoming call is to be routed, assigning predetermined priority levels to agents in the agent group, allocating a prescribed agent to a plurality of extension groups upon assigning a priority level to the prescribed agent, deciding an agent group that is a routing destination based upon the routing table when a call is terminated at the pilot extension, and routing the call to an idle agent, in the order of priority level thereof, in the agent group that is the routing destination.

Further, according to the present invention, the foregoing objects are attained by providing a routing table in correspondence to a pilot extension for designating one or plural agent groups to which an incoming call is to be routed, allocating a prescribed agent to a plurality of agent groups, deciding an agent group that is a routing destination based upon the routing table when a call is terminated at the pilot extension, and routing the call to an idle agent in the agent group that is the routing destination.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIGS. 6(a–c) are diagrams for describing an idle-agent queue;

DESCRIPTION OF THE PREFERRED EMBODIMENT (a) Overview of the invention

Figure 1:
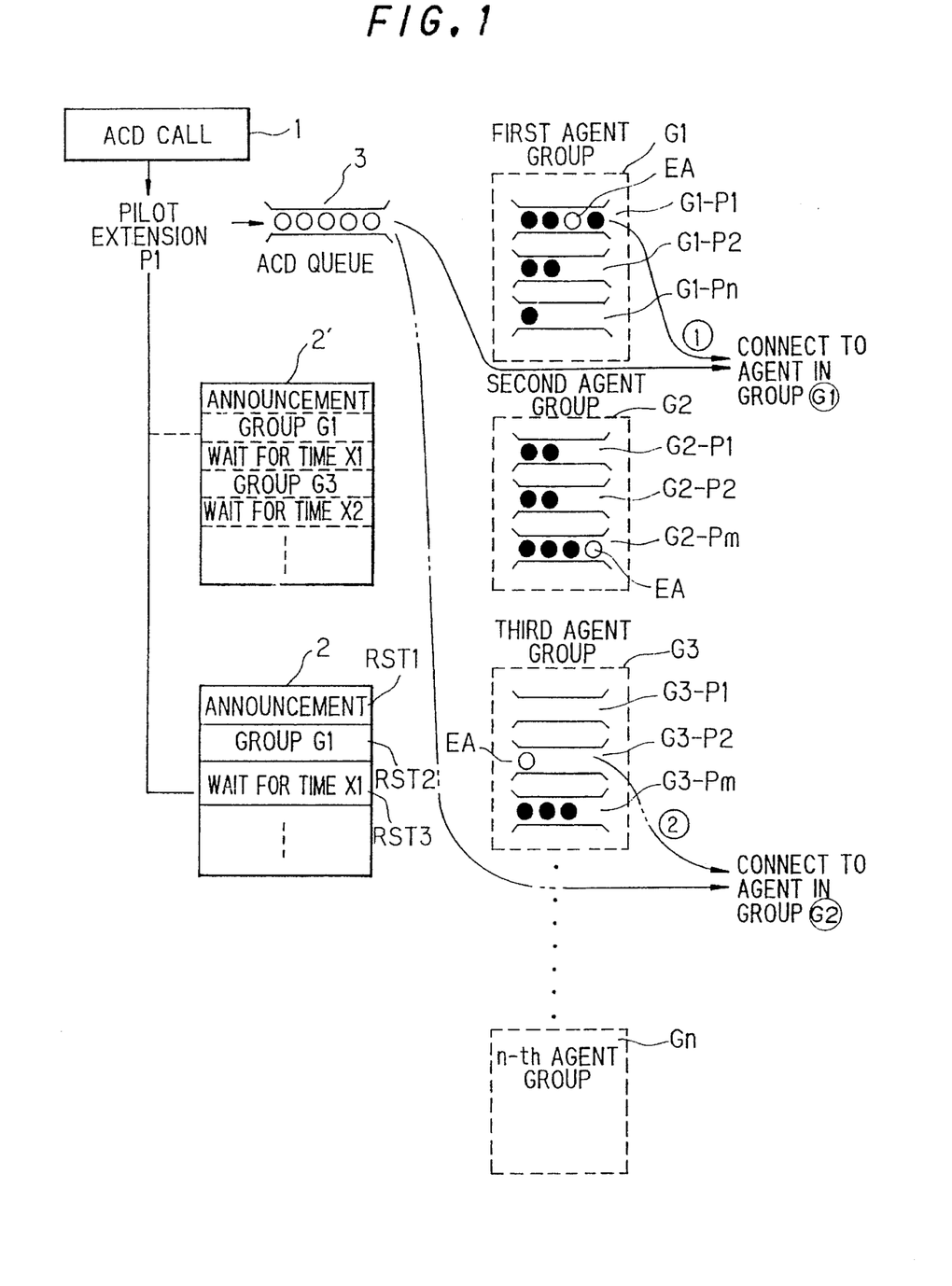
FIG. 1 is a diagram for describing the principles of the present invention.

FIG. 1 is a diagram for describing the principles of the present invention.

As shown in FIG. 1, an ACD incoming call 1 is terminated at a pilot extension P1, and a routing table 2 or 2' is provided in correspondence with the pilot extension P1. An ACD queue is provided for the pilot extension P1. First through n-th agent groups are shown at G1~Gn. Further, Gi-Pj (i=1, 2, ... n; j=1, 2, ... m) represents an idle-agent queue conforming to a j-th priority of an i-th agent group. An agent EA is allocated to a plurality of the agent groups.

The routing table 2 is provided in correspondence with the pilot extension P1 and includes a step RST2 for searching the agent group G1. Priority levels 1–m are assigned to the agents (extensions) that constitute each of the agent groups G1~Gn, and an idle-agent queue Gi-Pj is formed for every priority. In order to route the ACD call terminated at the pilot extension P1 to an idle agent, the steps of the routing table 2 are executed so as to search for an idle agent of the first agent group G1 in order of priority, whereupon the call is terminated at the idle agent found. By adopting this arrangement, ACD calls are distributed in order of priority; hence, incoming calls are distributed to the agents in the order of decreasing priority. Accordingly, by raising the priority of a skilled individual or specialized individual, the number of transfers of ACD calls terminated at an agent can be controlled to conform to skill level or degree of specialization. This makes possible more efficient, precisely devised services.

A skilled agent EA capable of dealing with a plurality of types of calls (services) is allocated to a plurality of agent groups G1~G3 upon being assigned a prescribed priority. Adopting this arrangement makes it possible to utilize the skilled agent EA satisfactorily and provide more efficient, precisely devised services. It should be noted that when one skilled agent EA is allocated to a plurality of agent groups in this manner and an incoming call terminates at the agent EA, the agent is removed from the corresponding plurality of queues G1-P1, G2-Pm, G3-P2. Further, in response to the end of the call, the agent is connected to the tail end of each of the corresponding plurality of queues.

Furthermore, in a case where two agent groups are designated by the routing table 2' instead of the routing table 2, the routing table 2' is provided with a step for connecting an incoming call to an announcement machine, a step (see ①) for seeking an idle agent in the first agent group G1 in order of priority and connecting the incoming call to an idle agent if one is found, and a step (see ②) for seeking an idle agent in the first and third agent groups G1, G3 in order of priority if an idle agent is not found upon elapse of a predetermined search time period, and connecting the incoming call to an idle agent if one is found. This makes it possible to furnish the caller with a service even if calls are being concentrated in one agent group.

(b) Configuration of preferred embodiment

Overall Configuration

Figure 2:
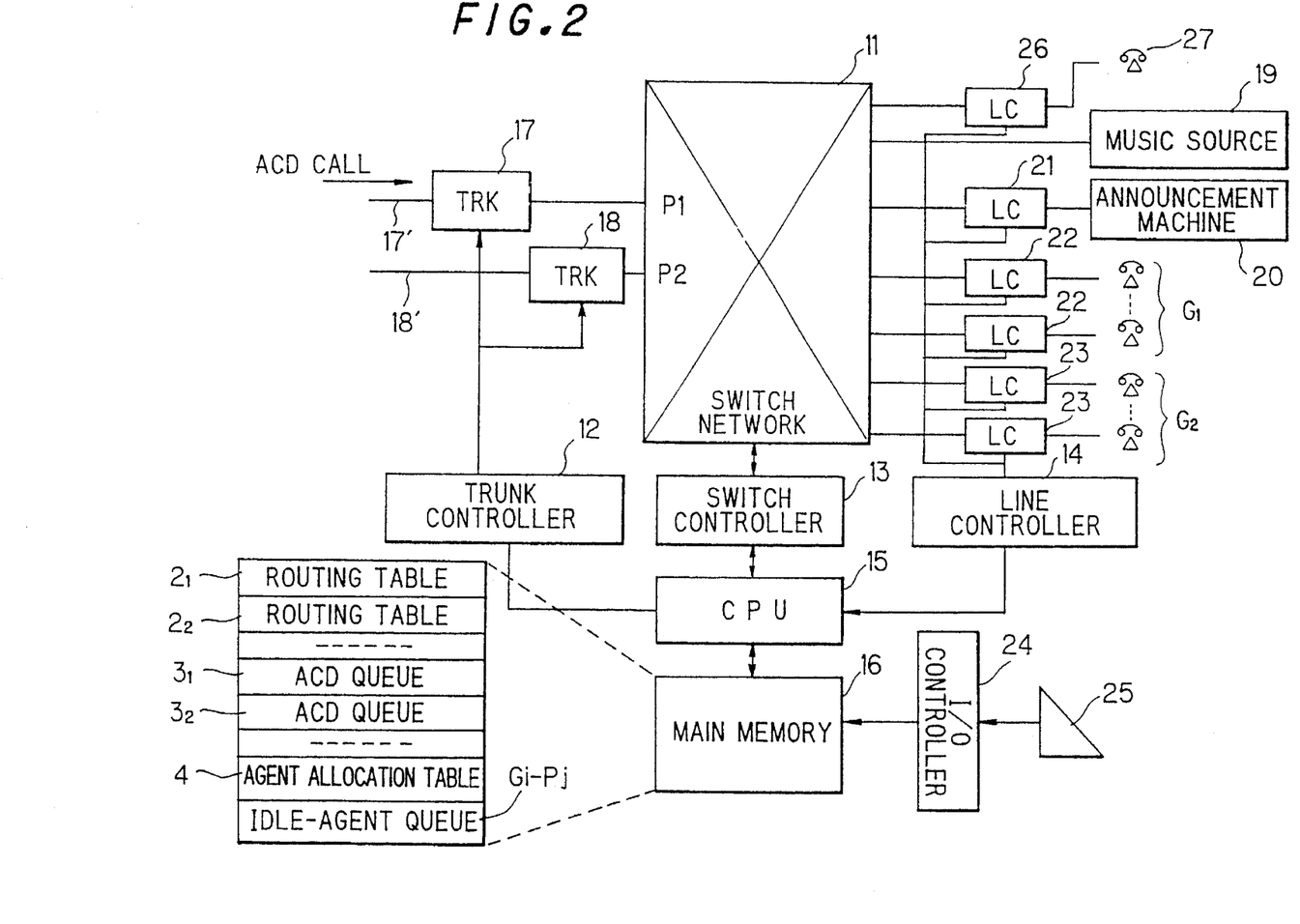
FIG. 2 is an overall block diagram of a private branch exchange in which the present invention is realized in concrete form.

FIG. 2 is a block diagram illustrating an ACD system for realizing the call distribution control method of the present invention. The ACD system includes a switch network 11, a trunk controller 12, a switch controller 13, a line controller 14, a central processing unit (CPU) 15, a main memory 16, trunks (TRK) 17, 18, a music source 19, an announcement machine 20, line circuits (LC) 21~23, 26, an I/O controller 24, maintenance console 25 and an attendant operator 27.

The trunks (TRK) 17, 18 are connected to the switch network 11. Though a number of lines are connected to each trunk, only lines 17', 18' are connected to respective ones of the trunks 17, 18 for the sake of simplicity. The trunks 17, 18 are provided for corresponding ones of pilot extensions P1, P2 and are controlled by the trunk controller 12 in a manner described below.

The music source 19 allows the caller to hear a predetermined melody and is connected to the switch network 11. The announcement machine 20 allows the caller to hear an appropriate announcement and is connected to the switch network 11 via the line circuit 21. The first agent group G1 comprising a number of agents (extensions) is connected to the switch network 11 via the line circuit 22. Similarly, the second agent group G2 comprising a number of agents is connected to the switch network 11 via the line circuit 23. Other agent groups also are connected to the switch network 11 via line circuits in a similar manner, though this is not illustrated. The CPU 15 controls the trunk controller 12, switch controller 13 and line controller 14 and accesses the main memory 16 to write and read data. The switch controller 13 performs control for connecting and disconnecting the trunks 17, 18 to and from the line circuits 21~23, 26 and music source 19, respectively. The maintenance console 25 is connected to the main memory 16 via the I/O controller 24.

The main memory 16 stores routing tables $2_1, 2_2 \ldots$ that correspond to pilot extensions P1, P2 . . . , respectively, as well as ACD queues $3_1, 3_2 \ldots$ for respective ones of the pilot extensions and an idle-agent queue Gi-Pj (i=1, 2, . . . ; j=1, 2, . . . m) for every priority Pj of each agent group Gi.

Routing Table

Figure 3:
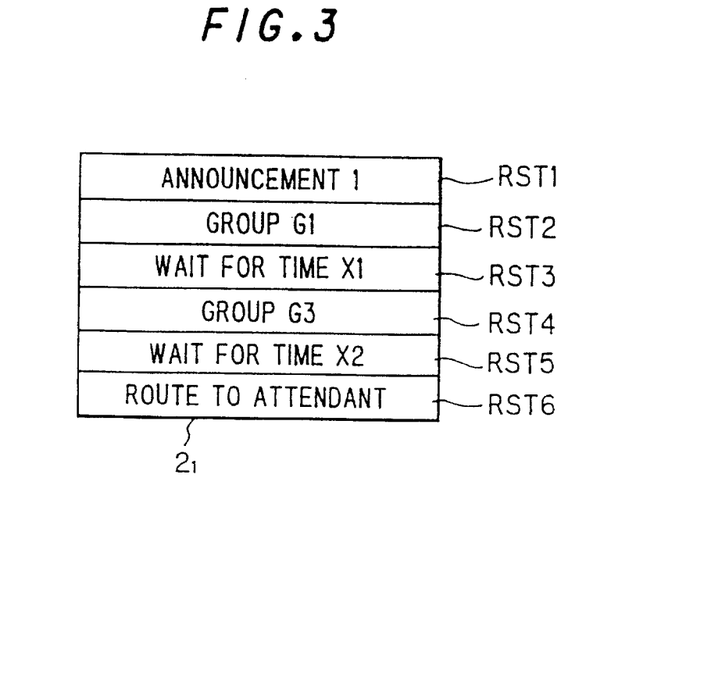
FIG. 3 is a diagram for describing the contents of a routing table.

FIG. 3 is a diagram showing the contents of the routing table $2_1$ that corresponds to the pilot extension P1. The routing table 21 has a plurality of steps RST1~RST6. The first step RST1 is a step for connecting the announcement machine 20 to a caller whose call has terminated at the pilot extension P1, allowing the caller to hear an announcement such as "This is XYZ Corporation. Please wait a moment.", connecting the music source 19 upon completion of the announcement and playing a predetermined melody while an idle agent is being sought. The second step RST2 is for searching for an idle agent in the first agent group G1 in the order of priority. The third step RST3 is a step at which the system waits a designated period of time X1 for an idle agent to be found in the first agent group G1. The fourth step RST4 is for adding an idle agent in the third agent group G3 as the object of the search if an idle agent cannot be found upon elapse of the time X1, and seeking an idle agent in the first and third agent groups G1, G3 in the order of priority. The fifth step RST5 is a step at which the system waits a designated period of time X2 for an idle agent to be found in the first and third agent groups G1, G3. The sixth step RST6 is for connecting the incoming call to the attendant operator 27 when an idle agent cannot be found in the first and third agent groups G1, G3. The operator responds to the call at this step and, if necessary, transmits a response telling the caller to try calling again later. The routing tables $2_1, 2_2 \ldots$ corresponding to the pilot extensions can be set and rewritten freely using the maintenance console 25.

Agent Allocation Table

Figure 4:
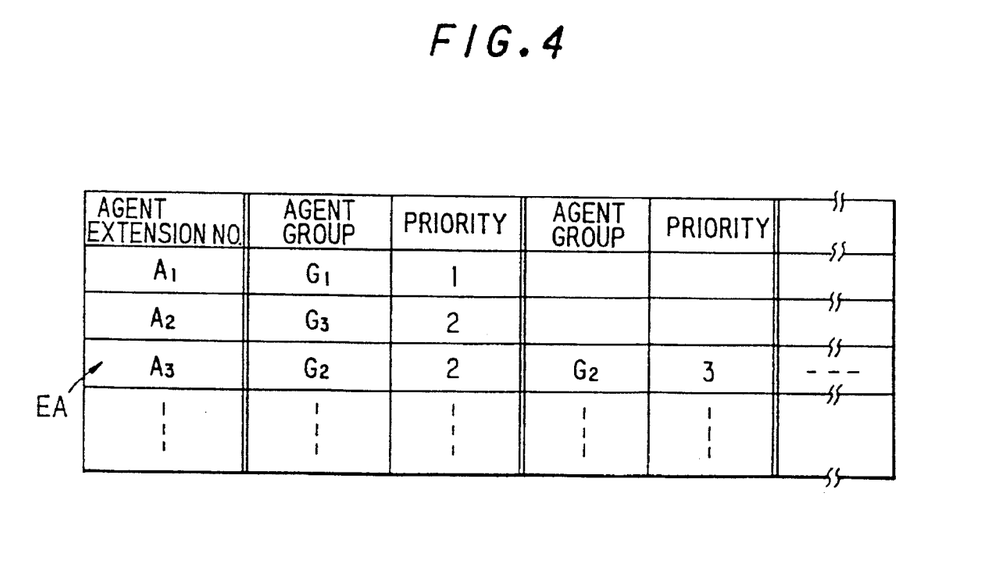
FIG. 4 is a diagram for describing a table of agent allocations.

As illustrated in FIG. 4, the agent allocation table 4 contains a list of agents and, in correlation with each agent, an agent group to which the particular agent belongs as well as the priority of the agent in its agent group. An agent allocated to a plurality of agent groups, such as in the case of the skilled agent EA, is correlated with plural sets of the agent groups and priority levels. The agent allocation table 4 can be set and changed using the maintenance console 25.

The assignment of priority levels and allocation to an agent group may be performed upon taking the following into consideration: Specifically, a high priority is assigned to a specialized agent having the skill for one type of call (service), and a low priority is assigned to an unskilled agent. It is then arranged so that an incoming call will be terminated at the skilled agent under ordinary circumstances and at the unskilled or unspecialized agent only when there are a large number of incoming calls. Further, a skilled agent capable of dealing also with incoming calls of a plurality of types is allocated to a plurality of agent groups and a low priority is assigned to this agent in each agent group. Ordinarily an incoming call is terminated at the skilled agent. If there are many incoming calls, then an incoming call is terminated at a skilled agent. Thus, a skilled agent can be utilized for a plurality of services to provide a highly efficient operation.

ACD Queue

Figure 5:
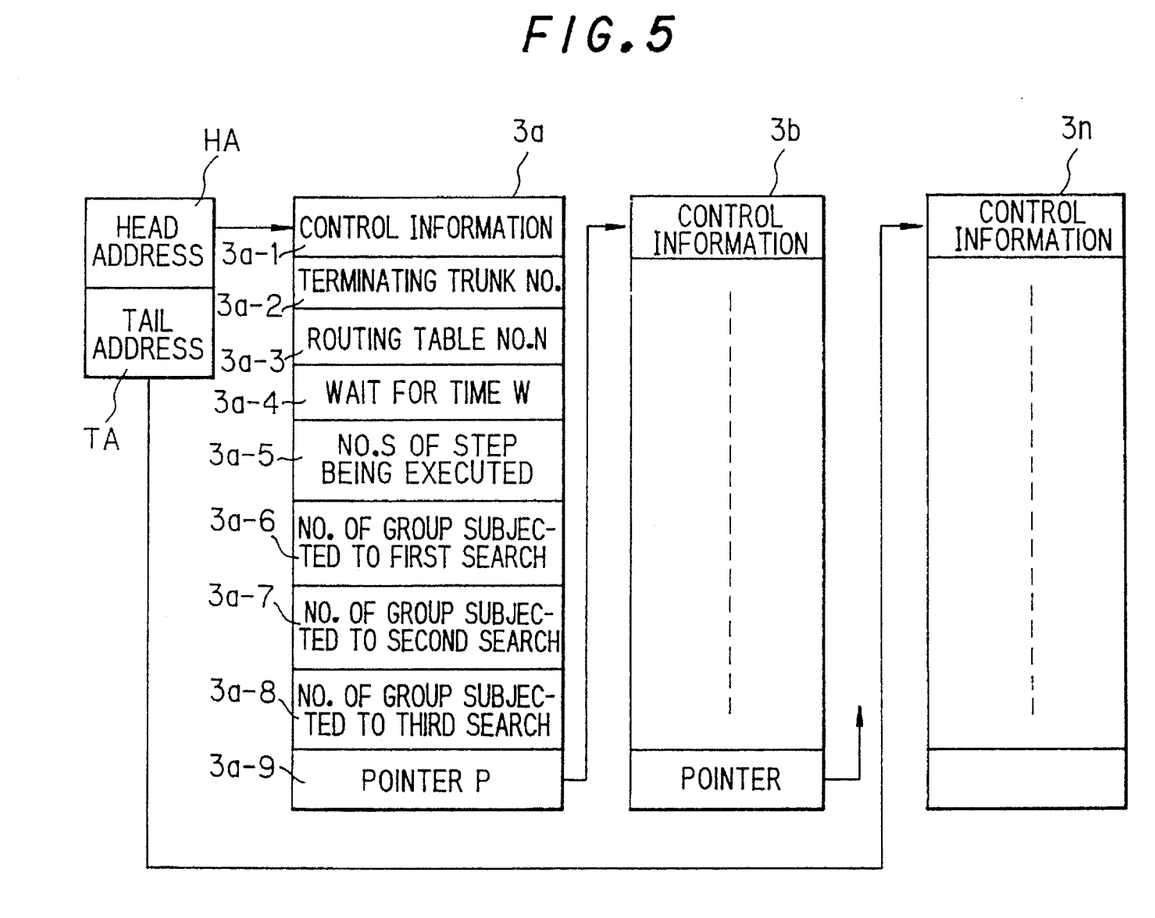
FIG. 5 is a diagram for describing an ACD queue.

The ACD queues $3_1, 3_2 \ldots$ are created for corresponding ones of the pilot extensions P1, P2 under the control Of the CPU 15 based upon control information from the trunk controller 12 and the state of execution of the routing table. The ACD queues are updated sequentially. FIG. 5 is a diagram for describing an ACD queue for an ACD call.

Call-data buffers 3a, 3b, . . . 3n constructing an ACD queue are generated one at a time whenever there is an ACD call, and the buffers are connected to the tail end of the ACD queue in successive fashion. It is so arranged that when an incoming call terminates at a prescribed idle agent, the call is removed from the queue. Each of the call-data buffers 3a~3n has a control-information storage area 3a-1, a storage area 3a-2 for storing a terminating trunk number, a storage area 3a-3 for storing a routing table number, a storage area 3a-4 for storing waiting time, a storage area 3a-5 for storing the number of a step current being executed, a storage area 3a-6 for storing the number of a group that is the object of a first search, a storage area 3a-7 for storing the number of a group that is the object of a second search, a storage area 3a-8 for storing the number of a group that is the object of a third search, and a pointer storage area 3a-9.

The control information includes the definition of the buffer classification, an indication as to whether the buffer is idle or in use, dialed number and the status number of a call, etc. The incoming trunk number indicates the number of the trunk terminating the incoming call, and a routing table number N indicates the routing table provided in correspondence with the pilot extension terminating the incoming call. Waiting time W indicates time counter for seeking an idle agent, and a number S of a step whose execution is in progress indicates the number of the step currently being executed in the routing table. The number of a group that is the object of a first search indicates the number of the first agent group to be searched for an idle agent, the number of a group that is the object of a second search indicates the number of an agent group to be searched for an idle agent in addition to the initial group, and the number of a group that is the object of a third search indicates the number of an agent group to be searched for an idle agent in addition to the earlier-mentioned groups. A pointer P indicates the head address of the call-data buffer for the next incoming call.

The CPU 15 possesses an address (head address) HA, of the main memory 16, stored by the initial call-data buffer 3a, and an address (tail address) TA stored by the tail call-data buffer 3n. When an idle agent is sought, the CPU 15 refers to the head address HA and, with regard to a prescribed number (e.g., six) calls from the initial ACD call, performs a search for an idle agent in accordance with the step S currently being executed for each call. When routing to a prescribed agent is achieved, the particular incoming call is removed from the ACD queue and then a search is performed again for an idle agent with regard to the initial six incoming calls. The search for an idle agent is performed in a similar manner periodically from this point onward. In other words, ACD calls are routed to idle agents in the order in which the calls are terminated.

Idle-agent queue

Figure 6A:
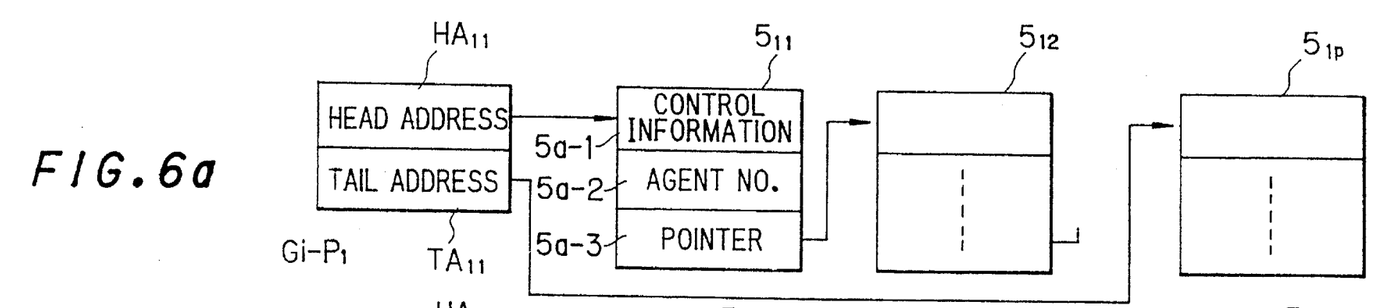
Figure 6B:
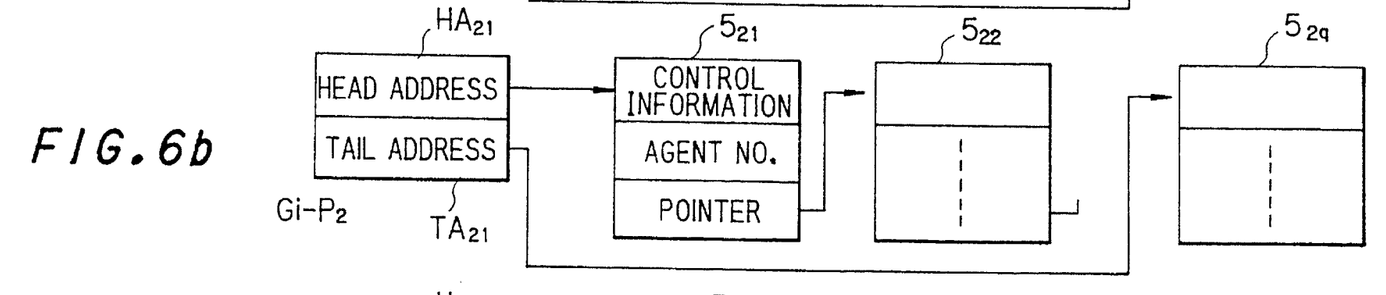
Figure 6C:
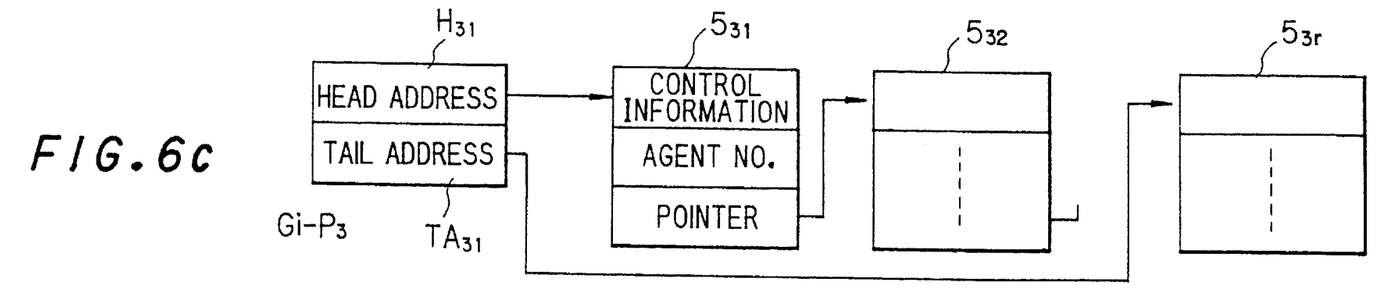

On the basis of information from the line controller 14, the agent allocation table 4 and status of routing, the CPU 15 generates and updates the idle-agent queue Gi-Pj rank by rank in each agent group. FIG. 6 is a diagram for describing idle-agent queues in an agent group Gi. In FIG. 6, (a) indicates an idle-agent queue Gi-P1 of a first priority, (b) indicates an idle-agent queue Gi-P2 of a second priority, and (c) indicates an idle-agent queue Gi-P3 of a third priority. Idle agent buffers $5_{11}, 5_{12}, \ldots, 5_{1p}; 5_{21}, 5_{22}, \ldots 5_{2q}; 5_{31}, 5_{32}, \ldots 53r$ constructing idle-agent queues Gi-Pj rank by rank are generated for each and every idle agent. More specifically, the CPU 15 generates an idle agent $5_{ij}$ when an agent is released from a call and becomes idle, and the agent that has become idle is connected to the tail end of the agent queue of the same priority. Then, when an ACD call is terminated at a prescribed idle agent, this agent is removed from the agent queue. In this case, when the agent at which the ACD call has terminated has been allocated to a plurality of agent groups upon having predetermined priorities assigned thereto, the agent is removed from the prescribed idle-agent queue of each agent group. When the call ends and the agent is released, the agent is connected to the above-mentioned plurality of idle-agent queues.

Each idle agent buffer has a control-information storage area 5a-1, an agent-number storage area 5a-2 and a pointer-storage area 5a-3 indicating the head address of the next idle agent buffer. The control information stored in the control-information storage area includes the buffer classification definition, an indication as to whether the buffer is idle or in use, and information relating to the line circuits 22, 23.

The CPU 15 possesses addresses (head addresses) $HA_{11}$, $HA_{21}$, $HA_{31}$ ..., of the main memory 16, stored by the idle agent buffers $5_{11}, 5_{21}, 5_{31}$ ... at the heads of the agent queues, as well as addresses (tail addresses) $TA_{11}, TA_{21}, TA_{31}$ ... stored by the idle agent buffers $5_{1p}, 5_{2q}, 5_{3r}$ ... at the tails of the agent queues. When an ACD call is terminated at an idle agent of a prescribed agent group, the CPU 15 obtains the idle agent at the head of the agent queue having the high priority and terminates the incoming call at this idle agent.

Overall Operation

Figure 7:
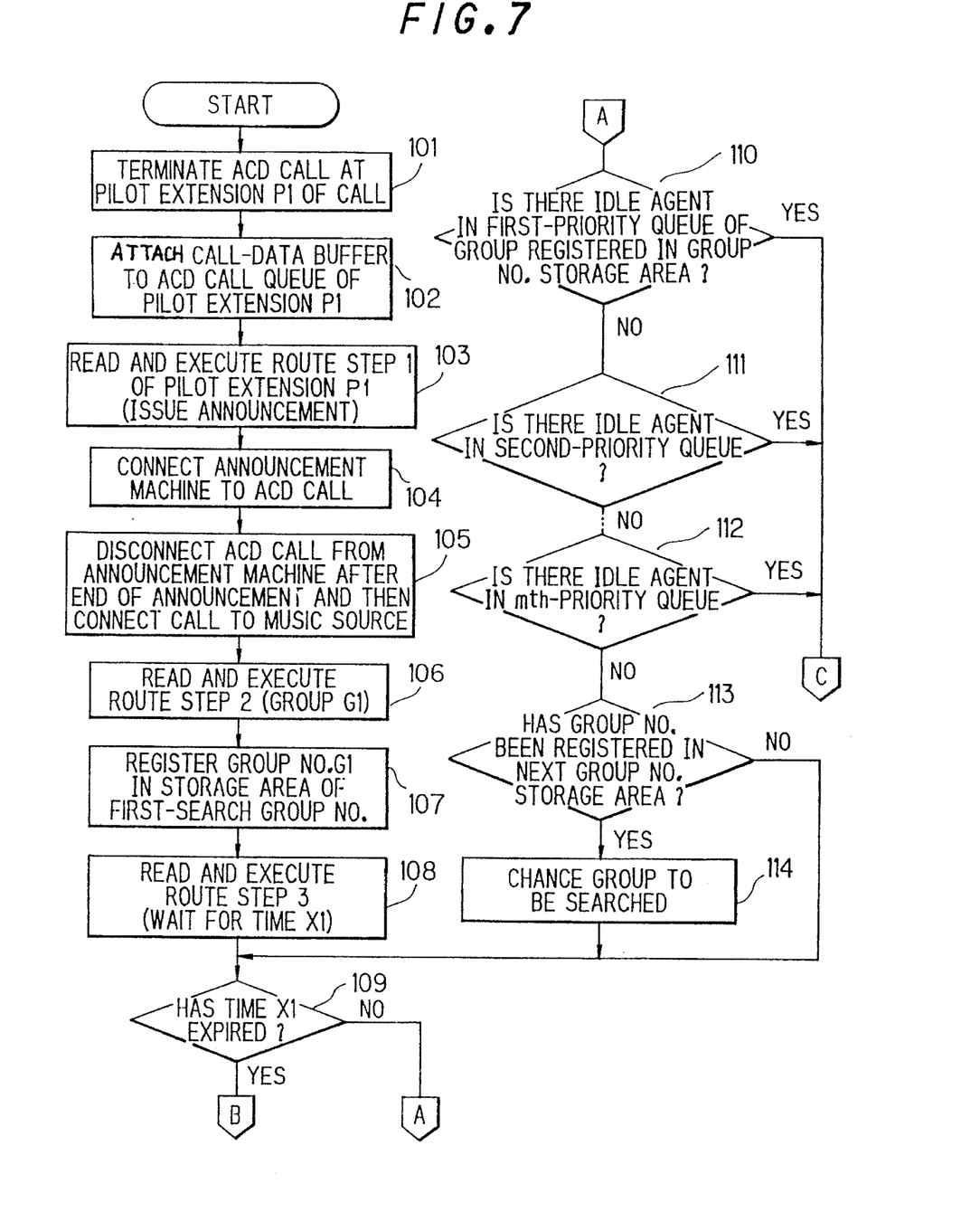
FIG. 7 is a flowchart (part 1) of call distribution control.
Figure 8:
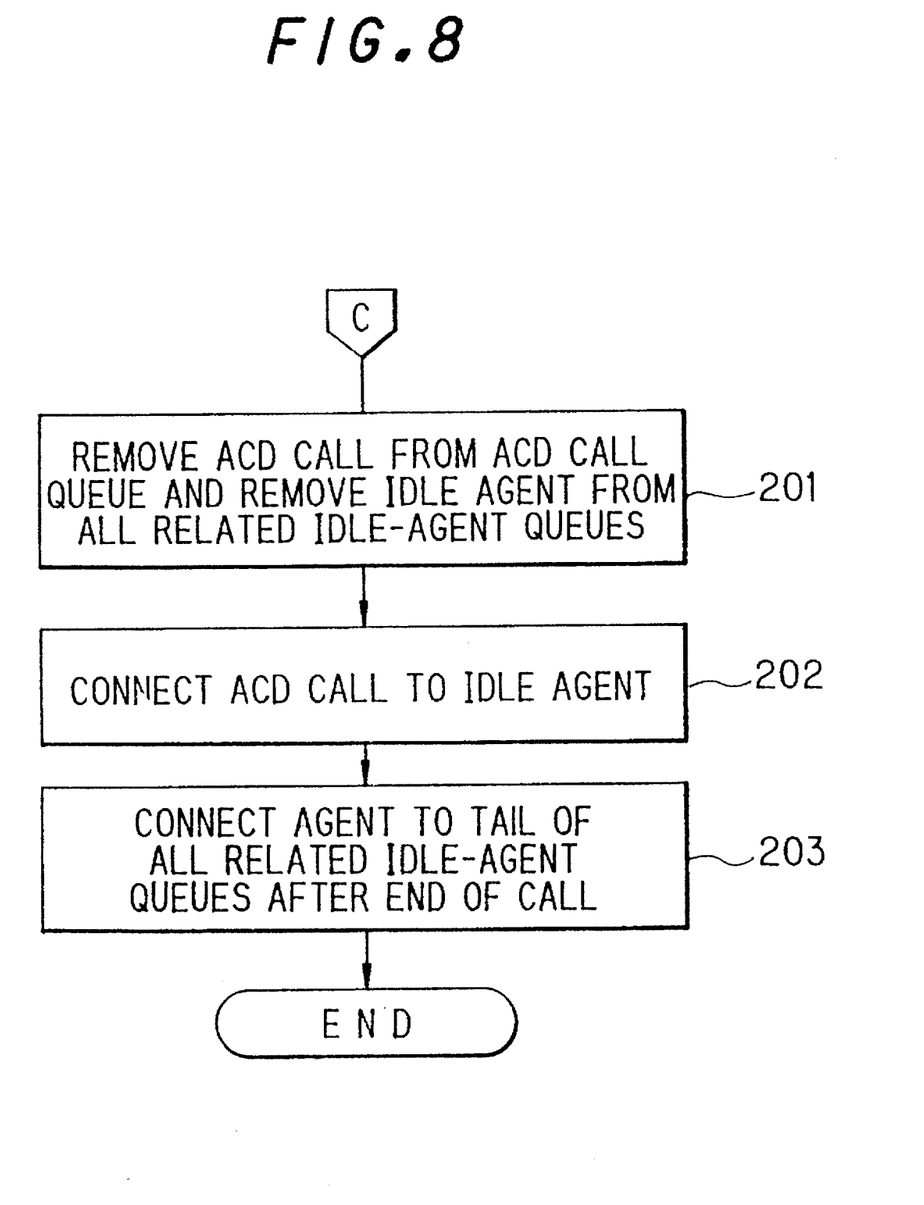
FIG. 8 is a flowchart (part 2) of call distribution control.
Figure 9:
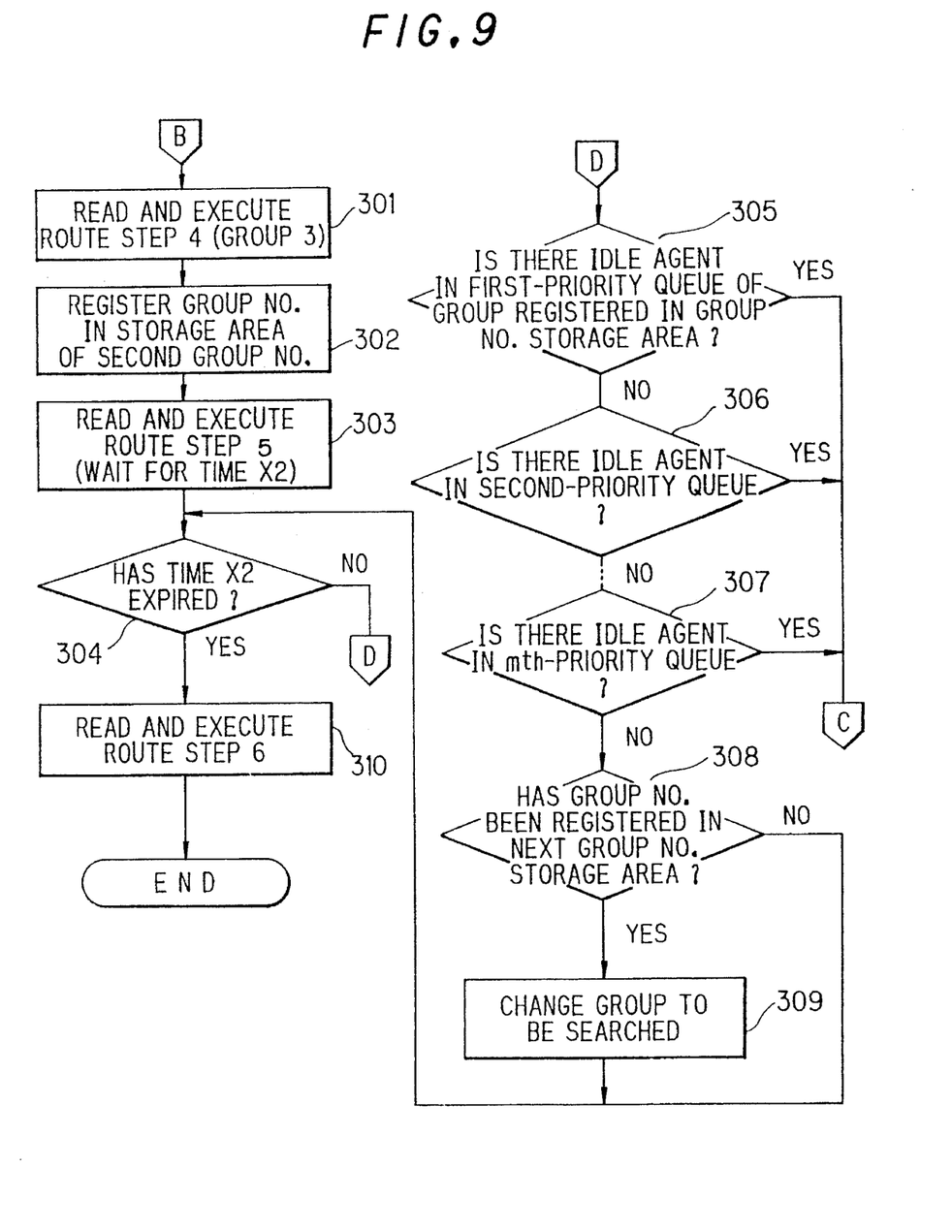
FIG. 9 is a flowchart (part 3) of call distribution control.

FIGS. 7 through 9 are flowcharts illustrating the distribution control of one incoming call.

When an ACD call terminates at the pilot extension P1 via the trunk 17 (step 101), the trunk 17 sends the control information such as the terminating trunk number to the trunk controller 12. In response, the trunk controller 12 recognizes that the ACD call has terminated at the pilot extension P1 and informs the CPU 15 of the control information. Upon receiving the control information, the CPU 15 generates a call-data buffer for this ACD call and connects it to the tail end of the ACD queue $3_1$ of the pilot extension P1 (see FIG. 5). Further, the CPU 15 obtains the routing table number N, which relates to the ACD call, from the terminating trunk number and stores the number N is the storage area 3a-3 of the call-data buffer (step 102).

Next, the CPU 15 reads the step RST1 out of the routing table 21 (see FIG. 3) and executes this step (step 103). More specifically, the CPU 15 controls the switch controller 13 and line controller 14 to connect the ACD call to the announcement machine 20. As a result, the caller is allowed to hear a predetermined announcement (step 104). When the announcement ends, the CPU 15 controls the switch controller 13 and line controller 14 to disconnect the ACD call from the announcement machine 20 and connect it to the music source 19 instead. The caller is then allowed to hear a predetermined melody for the time during which an idle agent is sought (step 105). The melody allows the caller to recognize that the line is being held.

Thereafter, the CPU 15 reads out and executes the step RST2 (FIG. 3) of the routing table 21 (step 106). Next, the CPU 15 stores the number of the first agent group G1, which has been designated as the object of the search by the step RST2, in the storage area 3a-6 for the number of the group that is the object of the first search (step 107). This is the storage area in the call-data buffer corresponding to the ACD call.

After the number of the group that is the object of the search is stored, the CPU 15 reads out the step RST3 of the routing table 21 (step 108), starts measuring elapsed time W and determines whether the elapsed time W has exceeded the predetermined waiting time X1 (step 109).

If W<X1 holds, the CPU 15 searches for an idle agent in the first agent group G1 that has been stored in the storage area 3a-6 for storing the number of the group that is the object of the first search. In other words, the CPU 15 determines whether an idle agent is available in the first-priority idle-agent queue G1-P1 (see FIG. 1) of the first agent group G1 (step 110). If an idle agent is not available, the CPU 15 determines whether an idle agent is available in the second-priority idle-agent queue G1-P2 of the first agent group G1 (step 111). If an idle agent is not available, then the search for an idle agent is performed in similar fashion up to the m-th priority, which is the lowest (step 112).

If the result of the search is that an idle agent does not exist in the first agent group, it is determined whether numbers of other groups to be searched have been stored in the storage areas 3a-7, 3a-8 for storing the numbers of other groups that are to be searched (step 113). In this case, since no other group number has been stored, the processing of step 109 is executed and the CPU 15 determines whether the elapsed time W has exceeded the designated waiting time X1. If W<X1 holds, then the processing from step 110 onward is executed and an idle agent is sought from the first agent group G1. If it is found at step 113 that the number of another group to be searched has been stored in an area for storing the number of a group to be searched, then the search for the idle agent is shifted to another agent group (step 114) and the processing from step 110 onward is executed so that an idle agent is sought in the other agent group.

If an idle agent is found in the agent queue G1-Pj of j-th priority in the first group G1 through steps 110 ~112, the ACD call is removed from the ACD call queue and this idle agent is removed from the agent queue G1-Pj. In this case, the CPU 15 refers to the agent allocation table 4 (see FIG. 4) and determines whether the idle agent has been allocated in a plurality of agent groups upon having prescribed priorities assigned thereto. If the idle agent has been assigned to a plurality of agent groups, then the idle agent is removed from the prescribed agent queue of each agent group (step 201).

Next, the CPU 15 controls the switch controller 13 and line controller 14 to connect the ACD call to and terminate it at the idle agent (step 202; see ① in FIG. 1). In response to the end of the call, the CPU 15 refers to the agent allocation table 4, obtains the agent queue that is for the purpose of connecting the released agent and connects this agent to the tail end of this queue (step 203). In the case where the agent released from the call has been allocated to a plurality agent groups upon having prescribed priorities assigned thereto, the agent is connected to the tail end of the prescribed agent queue in each of the agent groups.

If an agent in the first agent group G1 does not become idle even upon elapse of the predetermined time period X1 at step 109, the CPU 15 reads out and executes the step RST4 (FIG. 3) of the routing table 21 (step 301). The CPU 15 then stores the group number of the third agent group G3, which has been designated for search by the step RST4, in the storage area 3a-7, which is for storing the number of the group that is the object of the second search, of the call-data buffer (302). As a result, the third agent group G3 is added on as an object of the search.

After the number of the group to be searched is stored, the CPU 15 reads out the step RST5 of the routing table 2' (step 303), starts measuring the elapsed time W and determines whether the elapsed time W has exceeded the designated waiting time X2 (step 304).

If W<X2 holds, an idle agent is sought from the first agent group G1. In other words, the CPU 15 determines whether an idle agent is available in the first-priority idle-agent queue G1-P1 of the first agent group G1 (step 305). If an idle agent is not available, the CPU 15 determines whether an idle agent is available in the second-priority idle-agent queue G1-P2 of the first agent group G1 (step 306). If an idle agent is not available, then the search for an idle agent is performed in similar fashion up to the m-th priority, which is the lowest (step 307).

If the result of the search is that an idle agent does not exist in the first agent group, it is determined whether numbers of other groups to be searched have been stored in the storage areas 3a-7, 3a-8 for storing the numbers of other groups that are to be searched (step 308). In this particular example, group number G3 has been stored as the object of a search and therefore the search for the idle agent is shifted to the next agent group, namely agent group G3 (step 309) and processing from step 305 to step 308 is executed. Specifically, the CPU 15 determines whether an idle agent is available in the first-priority idle-agent queue G3-P1 of the third agent group G3 (step 305). If an idle agent is not available, the CPU 15 determines whether an idle agent is available in the second-priority idle-agent queue G3-P2 of the third agent group G3 (step 306). If an idle agent is not available, then the search for an idle agent is performed in similar fashion up to the m-th priority, which is the lowest (step 307). After all of the agent groups that are the object of the search have been searched, the group that is the object of the search is made G1 and the processing of step 304 is executed.

If W<X2 holds, processing from step 305 onward is repeated and an idle agent is sought from the agent groups G1, G3. The above-described processing is then repeated until the relation W≧X2 is established.

If an idle agent is found in an agent queue Gi-Pj of j-th priority in an i-th group by virtue of steps 305 ~307, the processing from step 201 onward is repeated and the ACD call is connected to and terminated at the idle agent found (see ② in FIG. 1).

If W≧X2 is determined to hold at step 304, i.e., if an agent does not become idle in the first and third agent groups G1, G3 even upon passage of predetermined time X2, the CPU 15 reads out the step RST6 of the routing table 21 and executes the same (step 310), thereby removing the ACD call from the ACD queue and then connecting the incoming call to the attendant operator 27 via the line circuit 26. The operator makes a response and, if necessary, transmits a response telling the caller to try calling again later.

(c) Modification

In the foregoing description, a prescribed agent is allocated to a plurality of agent groups upon being assigned a priority. However, an arrangement can be adopted in which a prescribed agent is allocated to a plurality of agent groups without being assigned a priority, no priority is assigned to the agents in each group and an incoming call is made to terminate in regular order within the group designated by the routing table. For example, an arrangement can be adopted in which ① a routing table that designates one or plural agent groups to which an incoming call is to be routed is provided for a corresponding pilot extension; ② a prescribed agent is allocated to a plurality of agent groups; ③ when an incoming call terminates at the pilot extension, the agent group that is the destination of routing is decided based upon the routing table; and ④ the call is routed to the idle agent in the agent group that is the destination of routing.

In accordance with the present invention as described above, it is so arranged that a priority is assigned to an agent in each agent group and ACD calls are distributed to idle agents in the order of priority. As a result, many incoming calls can be distributed to an agent having a high priority. Accordingly, by raising the priority of a skilled agent or a specialized agent, it is possible to control the number of transfers of ACD calls terminating at an agent in dependence upon skill level or level of specialization, as a result of which more efficient and precisely devised services can be provided.

Further, in accordance with the present invention, it is so arranged that a skilled agent capable of handling calls (services) of a plurality of types is allocated to the plurality of agent groups G1~G3 upon having a prescribed priority assigned thereto. This makes it possible to utilize the skilled agent more satisfactorily and to provide more efficient, finely-tuned services.

Further, in accordance with the present invention, it is so arranged that a plurality of agent groups are designated by a routing table and an idle agent is sought in order of priority. Therefore, even if calls are concentrating in one agent group, a call can be terminated at an agent in another agent group to provide the caller with service.

As many apparently widely different embodiments of the present invention can be made without departing from the spirit and scope thereof, it is to be understood that the invention is not limited to the specific embodiments thereof except as defined in the appended claims.

What is claimed is:

1. A call distribution control method for terminating an incoming call from a trunk or another extension at a pilot extension in a private branch exchange and routing the incoming call from the pilot extension to an idle agent in an agent group, comprising the steps of:

assigning a predetermined priority level to each agent in a respective one of a plurality of agent groups wherein an incoming call is to be routed to an idle agent having the highest priority level;

creating queues of the idle agents for each priority level in each agent group and storing said queues of the idle agents in a memory;

providing a routing table, in correspondence with the pilot extension, for designating an agent group to which an incoming call is to be routed;

designating an agent group based upon said routing table when an incoming call is terminated at the pilot extension;

searching for an idle agent having the highest priority level in said agent group that is the routing destination by reference to said queues of the idle agents for each priority level; and routing the incoming call to the searched idle agent.

2. The method according to claim 1, further comprising the steps of:

removing the agent, to which the incoming call has been routed, from an idle-agent queue of the corresponding priority level; and connecting said agent to a tail end of said idle-agent queue of the corresponding priority level in the agent group to which said agent belongs in response to an end of the incoming call.

3. The method according to claim 1, wherein if plural agent groups are designated by said routing table, said routing table includes a step of searching for an idle agent having the highest priority level in a first agent group and, if an idle agent is found on any priority level in the first group, connecting the incoming call to said idle agent; a step of increasing the number of agent groups by one and searching for an idle agent having the highest priority level in the first and second agent groups if no idle agent is found within a predetermined search time, and, if an idle agent is found in the first or second agent groups, connecting the incoming call to said idle agent; a step of subsequently continuing to increase the number of agent groups by one if no idle agent is found and search for an idle agent.

4. The method according to claim 3, further comprising the steps of:

when an incoming call terminates at a prescribed pilot extension, connecting the incoming call to a tail end of a call queue corresponding to the prescribed pilot extension, wherein the call queue is stored in a call queue memory having a call-data buffer for each incoming call; and storing in the call-data buffer a routing table number for identifying the routing table provided in correspondence with said prescribed pilot extension, an elapsed time being used to determine whether said predetermined search time elapses, a number of a routing step currently being executed, a number of an agent group in which an idle agent is to be searched, and a pointer indicating a call-data buffer address of the next incoming call;

searching for an idle agent, at predetermined intervals, in accordance with respective ones of currently prevailing routing steps with regard to a prescribed number of incoming calls from the head of a queue; and removing said incoming call from the call queue thereof when said incoming call is routed to an idle agent.

5. A call distribution control method for terminating an incoming call from a trunk or another extension at a pilot extension in a private branch exchange and routing the incoming call from the pilot extension to an idle agent in an agent group, comprising the steps of:

allocating a prescribed agent to plural agent groups so that many incoming calls are routed to said prescribed agent;

assigning a predetermined priority level to each agent in a respective one of a plurality of agent groups wherein an incoming call is to be routed to an idle agent having the highest priority level;

creating queues of idle agents for each priority level in each agent group and storing said queues of the idle agents in a memory;

providing a routing table, in correspondence with the pilot extension, for an agent group to which an incoming call terminated at the pilot extension is to be routed;

designating an agent group based upon said routing table when an incoming call is terminated at the pilot extension;

searching for an idle agent having the highest priority level in said agent group that is a routing destination by reference to said of the idle agents for each priority level; and routing the incoming call to the searched idle agent.

6. The method according to claim 5, further comprising the steps of:

removing the agent, to which the incoming call has been routed, from a corresponding one or plurality of idle-agent queues in a case where said agent has been allocated to one or a plurality of agent groups; and connecting said agent to a tail end of the corresponding one or plurality of queues in response to an end of the incoming call.

7. The method according to claim 5, wherein if plural agent groups are designated by said routing table, said routing table includes a step of searching for an idle agent having the highest priority level in a first agent group and, if an idle agent is found on any priority level in the first group, connecting the incoming call to said idle agent; a step of increasing the number of agent groups by one and searching for an idle agent having the highest priority level in the first and second agent groups if no idle group is found within a predetermined search time, and, if an idle agent is found in the first or second group, connecting the incoming call to said idle agent; and a step of subsequently continuing to increase the number of agent groups by one if no idle agent is found and search for an idle agent.

8. The method according to claim 7, further comprising the steps of:

when an incoming call terminates at a prescribed pilot extension, connecting the incoming call to a tail end of a call queue corresponding to the prescribed pilot extension, wherein the call queue is stored in a call queue memory having a call-data buffer for each incoming call; and storing in the call-data buffer a routing table number for identifying the routing table provided in correspondence with said prescribed pilot extension, an elapsed time being used to determine whether said predetermined search time elapses, a number of a routing step currently being executed, a number of an agent group in which an idle agent is to be searched, and a pointer indicating a call-data buffer address of the next incoming call;

searching for an idle agent, at predetermined intervals, in accordance with respective ones of currently prevailing routing steps with regard to a prescribed number of incoming calls from the head of a queue; and removing said incoming call from the call queue thereof when said incoming call is routed to an idle agent.

9. A call distribution control system in a private branch exchange for routing an incoming call from a pilot extension to an idle agent in an agent group when the incoming call from a trunk or another extension has terminated at the pilot extension, comprising:

a plurality of agent groups each constituted by agents having predetermined priority levels assigned thereto;

a routing table, provided for a corresponding pilot extension, for designating an agent group to which an incoming call is to be routed;

a queue memory for storing queues of the idle agents for each priority level in each agent group; and call distribution control means for routing the incoming call to an idle agent having the highest priority level, in the agent group that is designated by said routing table, wherein said call distribution control means searches for an idle agent having the highest priority level in the agent group designated by said routing table by reference to said queues of the agents for each priority level, routes an incoming call to the searched agent, releases the agent, to which the incoming call has been routed, from a corresponding queue of said idle agents, and connects said released agent to a tail end of the corresponding queue in response to an end of the incoming call.

10. The system according to claim 9, wherein a prescribed agent is allocated to plural agent groups upon assigning a priority level to said prescribed agent so that many incoming calls are routed to said prescribed agent.

11. The system according to claim 10, further comprising a call-queue memory for storing a call queue in an order in which incoming calls terminate at the pilot extension;

wherein the call distribution control means searches for an idle agent in a corresponding agent group with regard to a head incoming call of the call queue, and removes said incoming call from a call queue thereof when said incoming call has been routed to an idle agent.

* * * * *